June 14, 1949. J. T. LEONARD Re. 23,122

DOUBLE ACTING PUMP

Original Filed Feb. 15, 1946 3 Sheets-Sheet 1

Inventor:
John T. Leonard
By Williams, Bradbury & Hinds,
attorneys

June 14, 1949. J. T. LEONARD Re. 23,122

DOUBLE ACTING PUMP

Original Filed Feb. 15, 1946 3 Sheets-Sheet 2

Inventor:
John T. Leonard
By Williams, Bradbury & Hukle
attorneys

June 14, 1949. J. T. LEONARD Re. 23,122
DOUBLE ACTING PUMP
Original Filed Feb. 15, 1946 3 Sheets-Sheet 3
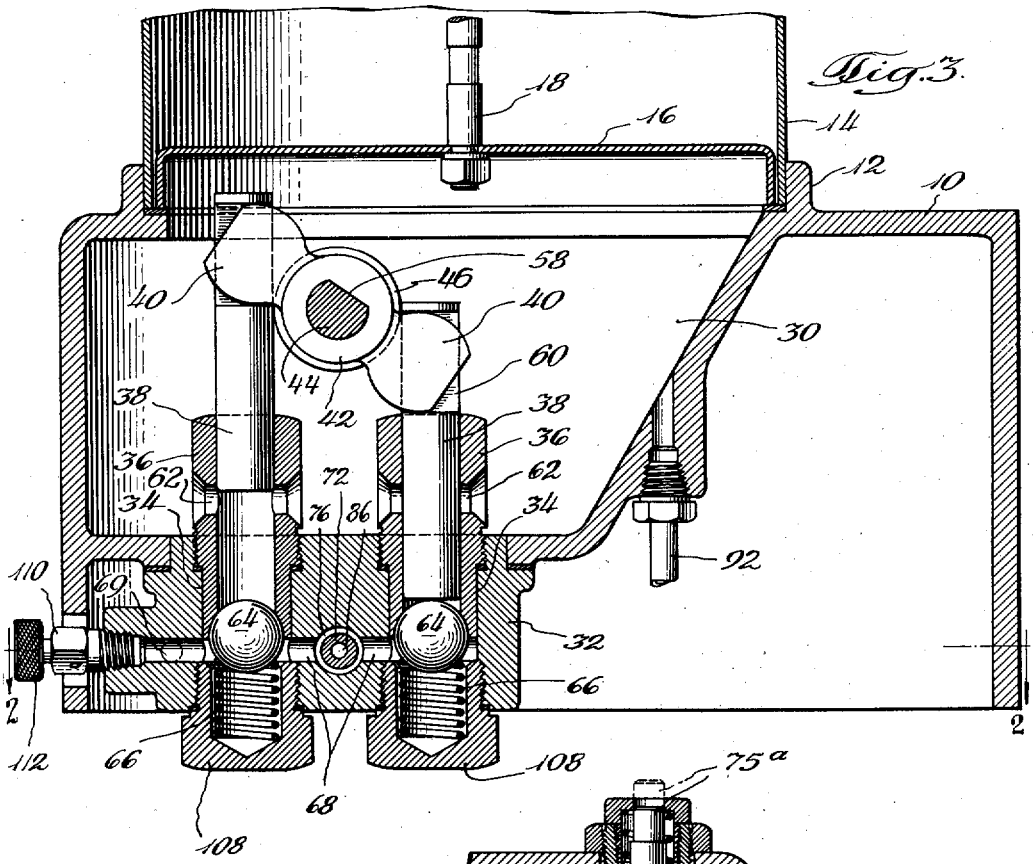
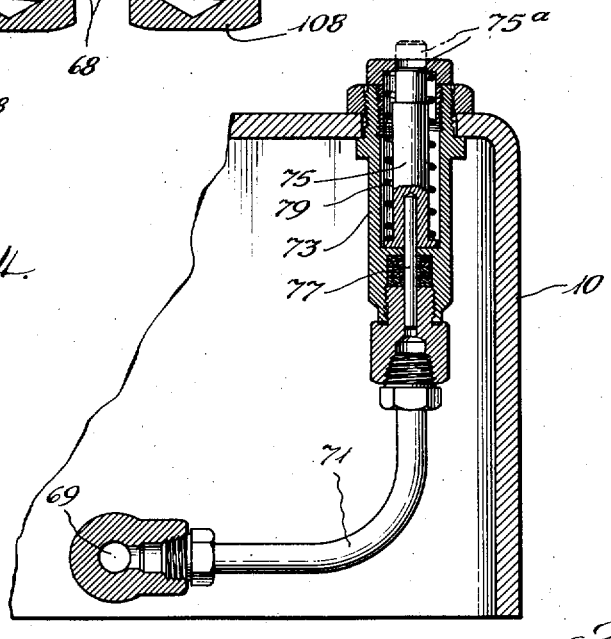
Fig. 4.
Inventor:
John T. Leonard
By Williams, Bradbury & Hinkle
Attorneys Reissued June 14, 1949 Re. 23,122

UNITED STATES PATENT OFFICE 23,122

DOUBLE-ACTING PUMP

John T. Leonard, Evanston, Ill.

Original No. 2,440,411, dated April 27, 1948, Serial No. 647,769, filed February 15, 1946. Application for reissue filed November 2, 1948, Serial No. 57,942

11 Claims. (Cl. 184—28)

This invention relates to a double-acting pump designed for use in a lubricant distributing system.

One object of the invention is to provide a simple and durable pump structure adapted for economical manufacture.

Another object of the invention is to provide a lubricant pumping unit with valve mechanism incorporated therein by which the unit is adapted for use in a reversible system arranged to lubricate a plurality of bearings connected in the system.

It is also an object of the invention to provide a lubricant pumping unit for periodically supplying lubricant to a group of bearings, and to provide at the pumping device a pressure responsive indicator to show when the lubricant has reached all the bearings of the group.

Other objects and advantages of the invention will appear from the following description, taken in connection with the drawings, in which:

Fig. 3 is a transverse vertical section taken substantially as indicated at line 3—3 in Fig. 2; and Fig. 4 is a detail sectional view taken substantially as indicated at line 4—4 in Fig. 2.

Figure 1:
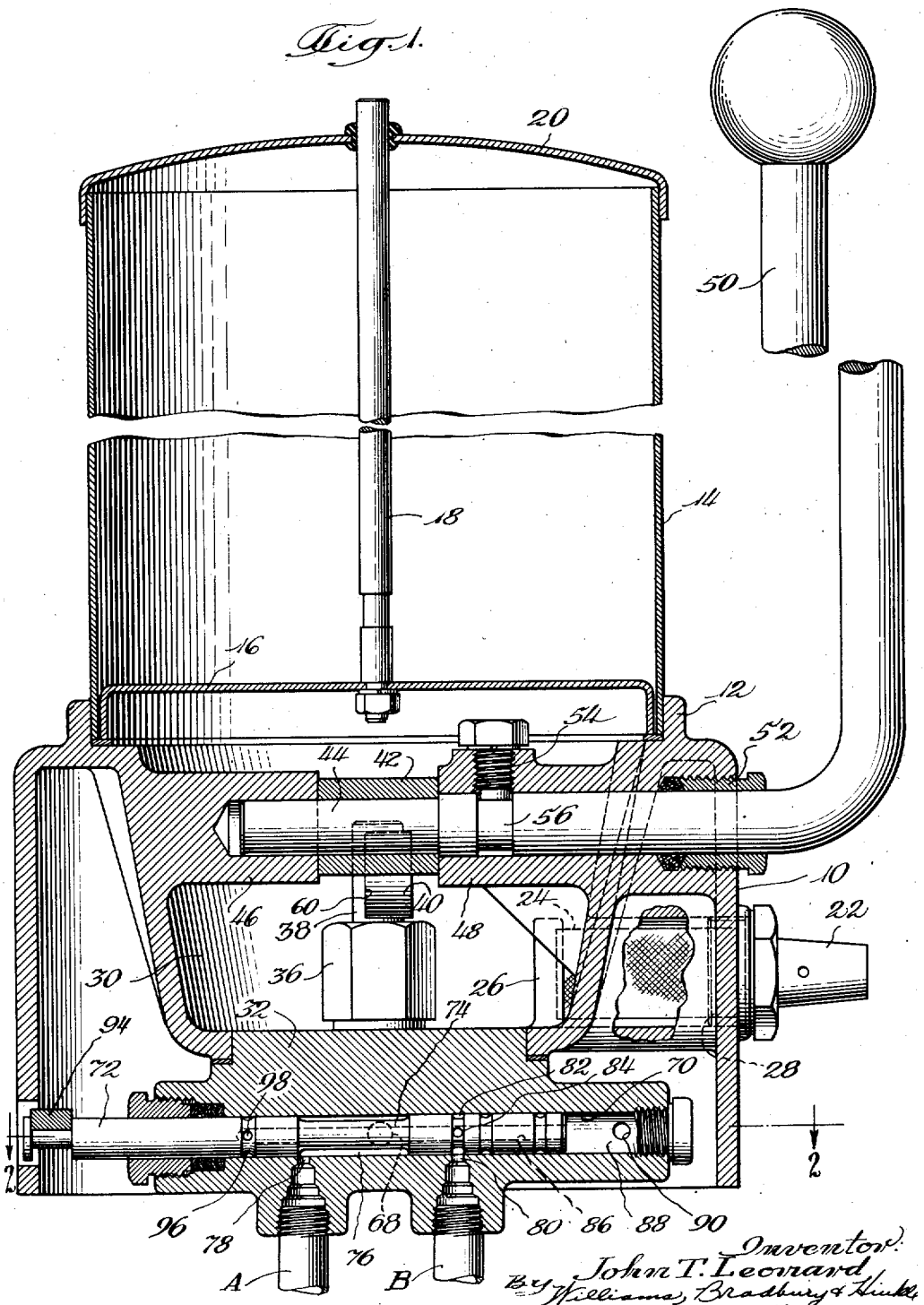
Fig. 1 is a vertical sectional view of a double acting lubricant pump embodying this invention and taken substantially as indicated at line 1—1 in Fig. 2.

The pump which is the subject matter of this invention is intended particularly for use in a lubricating system of the type in which a plurality of metering valves or control valves for individual bearings of the system are connected between a pair of feed lines which are supplied alternatively with lubricant fed into the system at intervals from the pump; the metering valves are so arranged that the system is reversible, the lubricant being fed to the valves from one supply line until all valves of the system have been actuated to supply lubricant to bearings connected with them, and the flow being then, or at a subsequent operating period, shifted so as to cause the valves to be operated by lubricant from the other line either for lubricating the same bearings or for feeding lubricant to a second group of bearings connected to the same valves. Distributing valves of this character are described in Patent #2,260,497 to John B. Whitted, dated October 28, 1941, being shown in Figures 20 to 24, inclusive, therein.

As shown in the drawings, the pump structure is mounted in a hollow base 10 having an upstanding flange 12 in which there is secured a tank or reservoir 14 for the lubricant to be distributed by the pump. The tank 14 is provided with the usual follower piston 16 having a piston rod 18 which extends slidably through the top wall 20 of the tank to serve as an indication of the quantity of lubricant remaining therein. The base 10 has projecting from it a fitting 22 adapted for connection with a hose or pipe through which lubricant may be supplied for filling the tank 14, and inside the base 10 the fitting 22 feeds through a cylindrical screen 24 which is secured between an upstanding lug 26 and the threaded annular portion 28 of the fitting 22 which is screwed into the side wall of the base 10.

A sump or supply chamber 30 is formed in the base 10 by partitions cast integrally therewith, this chamber being in open communication with the lower end of the tank 14. A casting 32 secured in the bottom wall of the chamber 30 and forming a portion of said bottom wall, is provided with a pair of vertical bores 34, 34 which are counterbored and threaded at their upper ends to receive the cylinders 36, 36 of the pump. Each of said cylinders is provided with a piston 38 reciprocable therein, and said pistons are arranged to be actuated alternately by cam arms 40, 40 extending from opposite sides of a hub 42 which is fixed to an operating shaft 44. The base 10 includes integral bearings 46 and 48 for said shaft 44, and outside the base 10 the shaft is bent at right angles to provide a handle portion 50. Preferably the shaft emerges from the base 10 through a stuffing box 52 and it is retained in its bearings by means of a set screw 54 having its inner end portion engaged in a groove 56 in the shaft. The inner end of the shaft is flattened on one side at 58 and the hub 42 is similarly formed for interengagement therewith. The upper end portion of each of the pistons 38 is formed with a notch 60 which embraces one of the cam arms 40, thus providing positive drive connections by which the rocking of the shaft 44 serves to reciprocate the pistons 38 in opposite directions.

Each of the cylinders 36 has inlet ports 62 which communicate with the interior of the sump or chamber 30 so that as each piston 38 reaches the upper limit of its movement, it uncovers the inlet ports 62 and admits a charge of lubricant to the cylinder. At its lower end each cylinder is provided with a ball check valve 64 normally seated by a spring 66 and adapted to be forced open by the downward stroke of the piston 38 to admit lubricant from the cylinder to a passage 68 formed in the casting 32.

Figure 2:
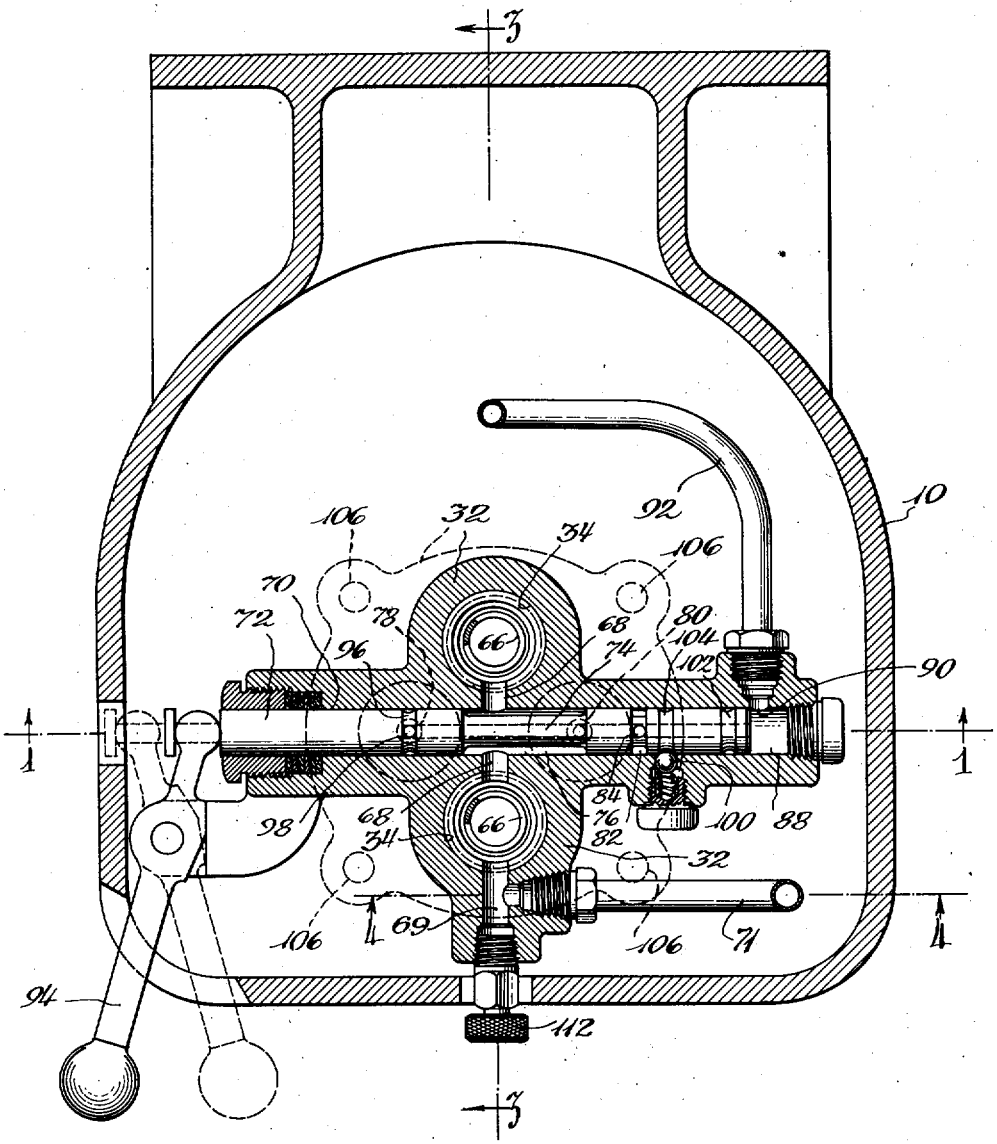
Fig. 2 is a horizontal sectional view of the pump taken substantially as indicated at line 2—2 in Fig. 1.

The passage 68 intersects a bore 70 in the casting 32 in which there is fitted a slide valve 72 having a reduced portion 74 which provides an annular space 76 communicating at all times with the portions of the passage 68 extending from both cylinders 36, 36. Thus the lubricant is first expelled from one cylinder and then from the other into passage 68. When the valve member 72 is positioned as shown in Figure 1, the space 76 communicates with an outlet port 78 having threaded connection with a feed pipe A of the lubricating system. Such feed pipe may be understood as leading to the metering valve of the system, said valves being operated by the lubricant pressure applied through the feed pipe A. A return pipe B leads back from the metering valves and is connected into the port 80 in the casting 32. With the valve 72 positioned as shown in Figure 1, the port 80 registers with a groove 82 in the valve member from which the ports 84 connect with a passage 86 extending axially in said valve member 72 and opening through one end of said member into a chamber 88 at the end of the bore 70. A port 90 in the wall of the chamber 88 is connected by a pipe 92 with a sump or chamber 30, as seen in Figures 2 and 3. In order that the pressure of the lubricant fed through the outlet port 78 and pipe A shall be effective to actuate the metering valves, any opposing pressure upon the valve must be relieved; such relief is afforded by way of the return pipe B which opens freely into the chamber 30. It should also be understood that all parts of the valves are kept normally filled with lubricant and that when the valves are actuated some of this lubricant is displaced and is fed back through the pipe B to the chamber 30. To feed the lubricant through the system in this manner, the operating handle 50 is rocked back and forth repeatedly to actuate both pistons 38 so that lubricant is fed alternately from the cylinders 36 into the passage 68 and to the outlet 78.

In some arrangements each distributing or metering valve of such a system serves two bearings; accordingly when ones series of bearings has been lubricated as just described the flow of lubricant is reversed through the system to serve the remaining bearings. In other cases each metering valve serves only one bearing but is arranged so that lubricant is fed to the bearing when pressure is applied to the system in one direction, and is again fed to the bearing when pressure is applied in the opposite direction. If the pump unit of this invention is employed in a system of the first type, the valve 72 will be shifted immediately after the lubricant has fully traversed the system in one direction, and the pump will then be operated to feed lubricant in the opposite direction, that is, through the port 80 and pipe B to the valves, with pipe A serving as the return passage to the sump 30. If the system is of the second type described, the valve 72 will be shifted only at the intervals at which relubrication is required by the bearings of the system.

The manually operable lever 94 engaged with the valve member 72 may be actuated to shift it to the position shown in Figure 2, in which the space 76 connects the passage 68 with the port 80 while a groove 96 in the valve member registers with the port 78. With the valve in this position, the lubricant discharged from the pump cylinders 36, 36 flows out into the system through the port 80 and returns by way of the port 78. The groove 96 is connected by ports 98 with the axial passage 86 in the valve member 72, thus providing for discharge of the return flow into the chamber 88 at the end of the bore 70 and thence into the sump 30 by way of the pipe 92. A spring pressed ball detent 100 is engageable with a groove 102 when the valve 72 is shifted to the first position above described, and engages in the groove 104 in the valve member when the latter is shifted to its second described position, as shown in Figure 2.

It may be understood that in systems of the type for which this pumping unit is intended the lubricant which is fed under pressure through the pipe A to the metering valves is not discharged directly therefrom to the bearings to be lubricated but is utilized to shift certain movable parts of the valves and is then stored in said valves until they are next actuated by pressure applied through the pipe B. Accordingly, when all the valves of the system have been operated and filled with lubricant furnished through the pipe A, there is no place for additional lubricant to go; therefore, continued operation of the pumping pistons 38, 38 will tend to build up the pressure rapidly in the pipe line A and passage 68.

A short continuation of the passage 68, denoted at 69 in Figures 3 and 4, is connected by a tube 71 with an indicator which comprises a cylinder 73 with a plunger 75 slidable therein, and a reduced portion or stem 77 on the plunger exposed at the end of the tube 71. A spring 79 resists outward movement of the plunger but upon the application of sufficient pressure to the tube 71 said spring is overcome and the plunger protrudes to the dotted line position indicated at **75*a* in Figure 4. The spring 79 may be made strong enough to resist the maximum pressure which it is considered may be necessary to feed lubricant to the bearings by operation of the metering valves—about 2000 lbs. per square inch—and when this pressure is exceeded in the pipe line A and passages 68 and 69 the indicator plunger 75 will be operated as described. When the pumping action is discontinued, the pressure in the passage 69 and tube 71 will subside or will be relieved immediately upon reversal of the valve 72 and thus permit the indicator plunger 75** to return to its normal position.

Before the pump is again actuated, the valve 72 will be shifted by means of its hand lever 94 so that the next operation of the pump will feed lubricant under pressure through the port 80 and pipe line B. This will have the effect of shifting movable parts in the metering valves to expel the lubricant stored therein from the previous operation, thus feeding such lubricant in suitably measured quantities to individual bearings and filling the metering valves with charges of additional lubricant to be similarly discharged at the next operation.

It will be seen that the mechanical construction of the pumping unit to which this invention is directed is relatively simple and requires a minimum amount of machining for finishing principal parts. The hollow cast base 10 will require only the finishing of the bearings 46 and 48 for the rock shaft 44 and the tapping of a hole for the threaded inlet fitting 28, except that the underside of the sump 30 will be drilled and tapped as indicated at 106 in Figure 2 to receive screws by which the cast block 32 is attached. Practically all the precision work required is concentrated in the block 32 which includes the bore 70 for the valve 72, the communicating ports 78 and 80 and a suitable opening for the spring detent 100. This block also includes the openings 34 in which the cylinders 36 are secured and the aligned threaded openings for the hollow caps 108, 108 in which the check valve springs 66 are seated. The passage 68, 69 is drilled to intersect the bores 34 and is threaded at its outer end to receive a vent fitting 110 having a needle valve with a knurled head 112 by which the valve may be opened occasionally to relieve any air pressure which may be trapped in the pump.

While there is shown and described herein certain structure embodying the invention and illustrative thereof, it is to be understood that the invention is not limited thereto or thereby, but embraces all changes and modifications in its various features which may come within the scope of the appended claims.

I claim:

1. In a pump of the class described, a hollow base casting which includes an upwardly open sump, a block fitted into and forming a portion of the bottom wall of said sump, said block having a vertical bore threaded at its upper end, a pump cylinder having its lower end portion fitted into said bore and having a threaded portion engaging said upper end portion of the bore, said block having a horizontal bore and a transverse bore connecting said vertical and horizontal bores, said block having also a pair of outlet ports which intersect said horizontal bore, a slide valve member movable in said horizontal bore to connect the outlet bores alternatively with said transverse bore, and a piston reciprocable in said cylinder.

2. In a pump of the class described, a hollow base casting which includes an upwardly open sump, a block fitted into and forming a portion of the bottom wall of said sump, said block having a vertical bore threaded at its upper end, a pump cylinder having its lower end portion fitted into said bore and having a threaded portion engaging said upper end portion of the bore, said block having a horizontal bore and a transverse bore connecting said vertical and horizontal bores, said block having also a pair of outlet ports which intersect said horizontal bore, a slide valve member movable in said horizontal bore to connect the outlet bores alternatively with said transverse bore, said valve member having a longitudinal passage with lateral ports positioned to connect said passage to said outlet ports alternatively, the longitudinal passage of the valve member opening into the horizontal bore, conduit means connecting a portion of said horizontal bore with the sump, and a piston reciprocable in said cylinder.

3. In a pump of the class described, a hollow base casting which includes an upwardly open sump, a block fitted into and forming a portion of the bottom wall of said sump, said block having a pair of vertical bores threaded at their upper ends, a pair of pump cylinders having their lower end portions fitted into said bores respectively and each having a threaded portion engaging the upper end portion of the bore, said block having a horizontal bore and a transverse bore connecting both said vertical bores with the horizontal bore, said block having also a pair of outlet ports which intersect said horizontal bore, a slide valve member movable in said horizontal bore to connect the outlet ports alternatively with said transverse bore and a pair of pistons reciprocable respectively in said cylinders, together with a rock shaft journalled in said hollow base and cams thereon engageable with said pistons for actuating them.

4. In a pump of the class described, a hollow base casting which includes an upwardly open sump, a block fitted into and forming a portion of the bottom wall of said sump, said block having a vertical bore threaded at its upper end, a pump cylinder having its lower end portion fitted into said bore and having a threaded portion engaging said upper end portion of the bore, said block having a horizontal bore and a transverse bore connecting said vertical and horizontal bores, said block having also a pair of outlet ports which intersect said horizontal bore, a slide valve member movable in said horizontal bore to connect the outlet bores alternatively with said transverse bore, a piston reciprocable in said cylinder, together with a pressure indicator comprising a cylinder mounted in a wall of said hollow base, a plunger having a portion adapted to be protruded from one end of the cylinder, spring means opposing such protrusion of the plunger, and conduit means through which the pressure developed in said transverse bore is applied to the other end of said plunger.

5. In a pump of the class described, a hollow base casting which includes an upwardly open sump, a block fitted into and forming a portion of the bottom wall of said sump, said block having a pair of vertical bores, a pair of pump cylinders having their lower end portions fitted respectively into said bores, said block having a horizontal bore disposed midway between the lower end portions of said vertical bores and a transverse bore which intersects said horizontal bore and both vertical bores with a portion of said transverse bore extending beyond one of the vertical bores, said block having also a pair of outlet ports intersecting the horizontal bore at longitudinally spaced portions thereof, a slide valve movable in said horizontal bore to connect said outlet ports alternatively with said transverse bore and the cylinder, a pair of pistons reciprocable in said cylinders, a check valve for each cylinder at its lower end, said cylinders having lateral inlet ports exposed in the sump, and a pressure indicator connected to said extension of the transverse bore for response to the pressure developed therein.

6. In a pump of the class described, a hollow base casting which includes an upwardly open sump, a block fitted into and forming a portion of the bottom wall of said sump, said block having a vertical bore threaded at its upper end, a pump cylinder having its lower end portion fitted into said bore and having a threaded portion engaging said upper end portion of the bore, said block having a horizontal bore and a transverse bore connecting said vertical and horizontal bores, said block having also a pair of outlet ports which intersect said horizontal bore, a slide valve member movable in said horizontal bore to connect the outlet bores alternatively with said transverse bore, a piston reciprocable in said cylinder, said cylinder extending upwardly into the sump and having a lateral inlet port exposed therein and uncovered by the piston at the upper limit of its reciprocation.

7. In a pump of the class described, a hollow base casting which includes an upwardly open sump, a block fitted into and forming a portion of the bottom wall of said sump, said block having a vertical bore threaded at its upper end, a pump cylinder having its lower end portion fitted into said bore and having a threaded portion engaging said upper end portion of the bore, said block having a horizontal bore and a transverse bore connecting said vertical and horizontal bores, said block having also a pair of outlet ports which intersect said horizontal bore, a slide valve member movable in said horizontal bore to connect the outlet bores alternatively with said transverse bore, a piston reciprocable in said cylinder, together with a ball check valve seating upwardly against the lower end of said cylinder, the lower end of said bore in the block being threaded and a hollow threaded cap secured therein with a spring for the check valve pocketed in said cap.

8. In a pump of the class described, a hollow base casting which includes an upwardly open sump, a block fitted into and forming a portion of the bottom wall of said sump, said block having a pair of vertical bores, a pair of pump cylinders having their lower end portions fitted respectively into said bores, said block having a horizontal bore disposed midway between the lower end portions of said vertical bores and a transverse bore which intersects said horizontal bore and both vertical bores with a portion of said transverse bore extending beyond one of the vertical bores, said block having also a pair of outlet ports intersecting the horizontal bore at longitudinally spaced portions thereof, a slide valve movable in said horizontal bore to connect said outlet ports alternatively with said transverse bore and the cylinders, a pair of pistons reciprocable in said cylinders, and a manually operable air vent valve in said extension of the transverse bore and accessible outside the hollow base.

9. In a pump of the class described, a hollow base which includes an upwardly open sump, the bottom portion of said base being formed to provide the bottom wall of said sump, said bottom portion having a pair of vertical cylinder bores and having a horizontal bore and a transverse bore connecting said vertical cylinder bores with the horizontal bore, said bottom portion having also a pair of outlet ports which intersect said horizontal bore, a slide valve member movable in said horizontal bore to connect the outlet ports alternatively with said transverse bore, and a pair of pistons reciprocable respectively in said vertical cylinder bores, a rock shaft journaled in said hollow base, and means on the rock shaft engageable with said pistons for actuating them.

10. In a pump of the class described, a base structure including an upwardly open sump and a bottom portion, a vertical cylinder bore in said bottom portion, said bottom portion having a horizontal bore and a transverse bore connecting said vertical cylinder bore and said horizontal bore, said bottom portion having also a pair of outlet ports which intersect said horizontal bore, a slide valve member movable in said horizontal bore to connect the outlet bores alternatively with said transverse bore, and a piston reciprocable in said vertical cylinder bore.

11. In a pump of the class described, an upwardly open sump including a bottom portion, a pair of vertical cylinder bores formed in said bottom portion, a horizontal bore and a transverse bore connecting said vertical cylinder bores with the horizontal bore, said bottom portion having also a pair of outlet ports which intersect said horizontal bore, a slide valve member movable in said horizontal bore to connect the outlet ports alternatively with said transverse bore, a pair of pistons reciprocable respectively in said cylinder bores, a rock shaft journalled in the wall of said sump, and arms on the rock shaft engaging said pistons for actuating them.

JOHN T. LEONARD.

REFERENCES CITED

The following references are of record in the file of this patent:

UNITED STATES PATENTS

| Number | Name | Date |
|---|---|---|
| 2,168,937 | Hillis | Aug. 8, 1939 |
| 2,170,327 | Hillis | Aug. 22, 1939 |